Oct. 9, 1945.    J. M. O'MALLEY    2,386,630
UNIVERSAL COUPLING
Filed Jan. 6, 1943    2 Sheets-Sheet 1

Inventor
JOSEPH M. O'MALLEY
By Albert G. Blodgett
Attorney

Oct. 9, 1945.   J. M. O'MALLEY   2,386,630
UNIVERSAL COUPLING
Filed Jan. 6, 1943   2 Sheets-Sheet 2
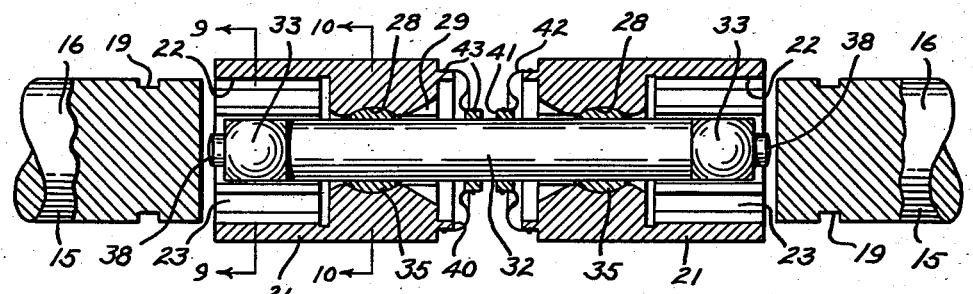
Fig. 5
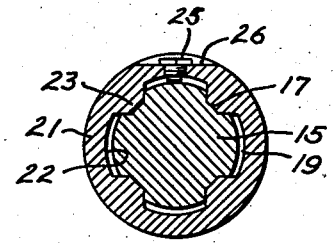
Fig. 6
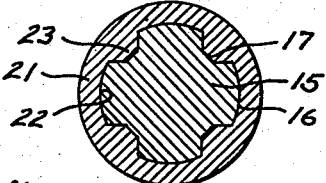
Fig. 7
Fig. 12
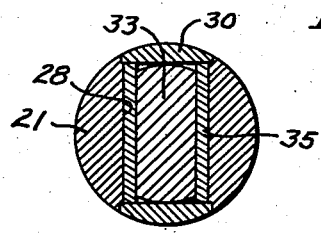
Fig. 8
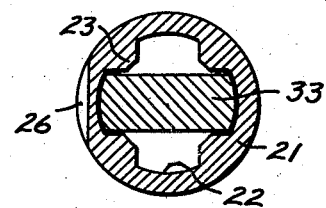
Fig. 9
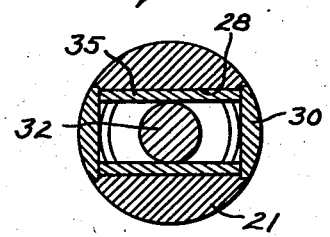
Fig. 10
Fig. 11
Inventor
JOSEPH M. O'MALLEY
By Albert G. Blodgett
Attorney Patented Oct. 9, 1945

2,386,630

UNITED STATES PATENT OFFICE 2,386,630

UNIVERSAL COUPLING

Joseph M. O'Malley, Worcester, Mass., assignor to Morgan Construction Company, Worcester, Mass., a corporation of Massachusetts Application January 6, 1943, Serial No. 471,422

8 Claims. (Cl. 64—7)

This invention relates to universal couplings, and more particularly to spindle couplings of the type used in rolling mills to connect the pinion shafts with the roll necks.

Rolling mill spindle couplings are subjected to heavy torques, they must operate with considerable misalignment, and they are limited in overall diameter to avoid interference with adjacent couplings. Many of these devices as heretofore constructed have been noisy in operation and subject to severe wear. Many prior couplings have been complicated and expensive to manufacture. Changing of rolls or removal of the spindle has been difficult and time-consuming.

It is accordingly one object of the invention to provide a universal coupling particularly suitable for driving rolling mills and capable of transmitting heavy torques under conditions of appreciable misalignment.

It is a further object of the invention to provide a rolling mill spindle coupling which will operate quietly and under severe operating conditions throughout a long life of service.

It is a further object of the invention to provide a rolling mill spindle coupling which will be comparatively simple and inexpensive to manufacture.

It is a further object of the invention to provide a rolling mill spindle coupling so constructed and arranged that the rolls can easily be changed or the spindle removed in a simple and expeditious manner.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts.

Fig. 5 is a view similar to Fig. 3 but showing the coupling disconnected from the shafts;

Fig. 6 is a section on the line 6—6 of Fig. 4;

Fig. 7 is a section on the line 7—7 of Fig. 4;

Fig. 8 is a section on the line 8—8 of Fig. 4;

Fig. 9 is a section on the line 9—9 of Fig. 5;

Fig. 10 is a section on the line 10—10 of Fig. 5;

Fig. 11 is a perspective view of a slipper forming a part of the mechanism; and

Fig. 12 is a detail of a ring, on a somewhat enlarged scale.

Figure 1:
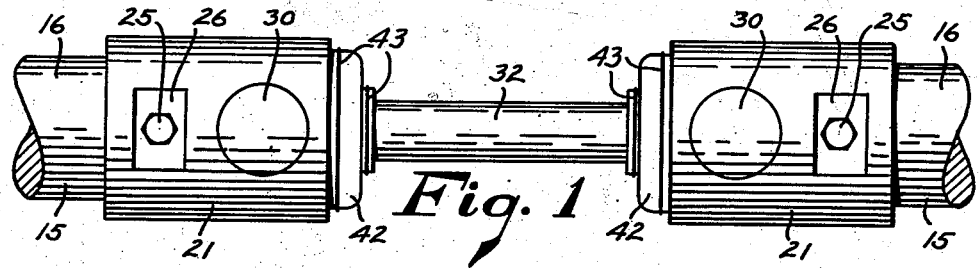
Fig. 1 is an elevation of a spindle coupling in its operative position.

The embodiment illustrated comprises two rotatable elements or shafts 15 which are arranged in approximate alignment and project toward one another, with their adjacent ends spaced apart. One of these elements may be the neck of a rolling mill roll, and the other element may be the pinion shaft which serves to drive the roll. The end portion of each of these elements is provided with a cylindrical outer surface 16 which is interrupted by four longitudinally extending grooves 17 equally spaced about the circumference. These grooves are deep, and the adjacent sides of adjacent grooves lie in parallel planes. The cylindrical surface 16 is also interrupted by a comparatively shallow circumferential groove 19 located approximately midway of the length of the grooves 17.

On each of the rotatable elements 15 there is mounted a coupling member 21 having a cylindrical outer surface. Each member 21 has a socket 22 in its outer end shaped to receive the end portion of the adjacent element 15. This socket has a cylindrical inner surface which is interrupted by four longitudinally extending ribs 23 equally spaced circumferentially. These ribs are shaped to fit within the grooves 17 at assembly. In order to hold the member 21 in place during periods of operation, a screw 25 extends radially therethrough into the groove 19, the head of the screw being located in a recess 26 in the coupling member so that it will not project above the cylindrical outer surface thereof.

The inner portion of each coupling member 21 is provided with a transverse cylindrical bore 28 with its axis located in a plane passing between the ribs 23. This bore is intersected by a chamber 29 which extends from the socket 22 to the inner end of the coupling member. This chamber is oblong in transverse cross-section, it being elongated in a direction parallel with the bore 28 to a dimension approximately equal to the diameter of the socket 22. Preferably, the opposite ends of the bore 28 are counterbored (as best shown in Fig. 8) to receive plugs 30 which are suitably secured in place by welding or other means. The outer surfaces of these plugs are cylindrical to conform smoothly with the outer surfaces of the coupling member, and their inner surfaces are plane and spaced apart a distance approximately equal to the diameter of the socket 22. The diameter of the bore 28 is preferably somewhat greater than the width of the grooves between adjacent ribs 23 in the socket 22.

The two coupling members 21 are connected to one another by a spindle 32 having at its opposite ends two transversely extending heads 33 which are preferably integral with the spindle and form T-shaped structures therewith. These heads are positioned within the bores 28. The opposite sides of each head are formed by plane parallel surfaces which are engaged by slippers 35, each slipper having a convex cylindrical surface 36 (Fig. 11) of the same radius as the bore 28 and engaging the wall thereof at assembly. The spindle 32 is preferably cylindrical, with its diameter approximately equal to the thickness of the heads 33, this dimension being slightly less than the distance between two adjacent ribs 23 in the socket 22. The slippers 35 and the heads 33 are preferably approximately equal in length to the distance between the plane faces of the plugs 30, and the ends of the heads are formed as surfaces of spheres having diameters equal to the same distance. On each end of the spindle 32 there is provided an axially projecting boss or lug 38 which extends into proximity with the ends of the adjacent element 15 to prevent appreciable axial displacement of the spindle.

Provision is made for retaining grease within the couplings. For this purpose each coupling member 21 is provided with an annular flange 40 on its inner end, and a pair of rings 41 are slidably mounted on the spindle 32. Each flange 40 is connected to the adjacent ring 41 by an annular boot 42 of a suitable flexible material, such as a grease-tight fabric, held in place by wires 43. For the purpose of assembly, each ring 41 is made in two diametrically separable parts, as shown in Fig. 12, with the ends of these parts interfitting. In the assembled mechanism the wires 43 will hold the two parts of each ring together.

The operation of the invention will now be apparent from the above disclosure. The spindle 32 and its associated parts will transmit power from one of the shafts 15 to the other smoothly and uniformly even though these shafts may be considerably out of alignment. Under such operating conditions there will be a continuous oscillating movement of the spindle heads 33 between the slippers 35, and a continuous oscillating movement of the slippers 35 in the cylindrical bores 28. These movements involve a sliding action between surfaces which are well lubricated and of ample area to avoid excessive concentrations of pressure thereon. These surfaces are entirely enclosed to retain the grease and prevent access of foreign matter. The annular coupling members 21 provide great strength to support the slippers, and they can be made appreciably smaller in outside diameter than the bifurcated members commonly used in prior couplings, which tend to spread apart when subjected to heavy torques.

Figure 2:
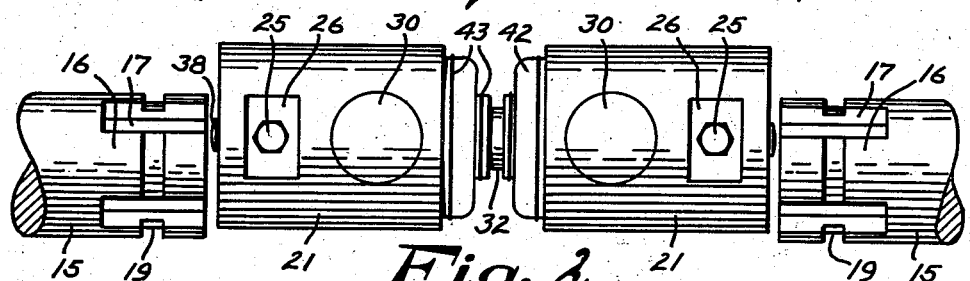
Fig. 2 is an elevation of the coupling disconnected from the shafts at its opposite ends.
Figure 3:
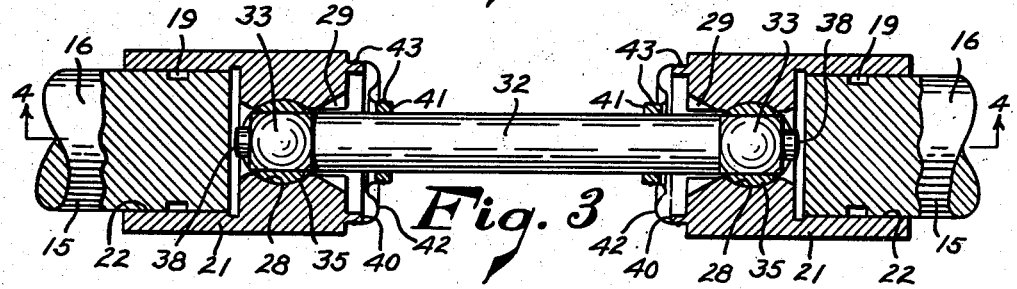
Fig. 3 is a longitudinal section through the coupling and its associated parts.
Figure 4:
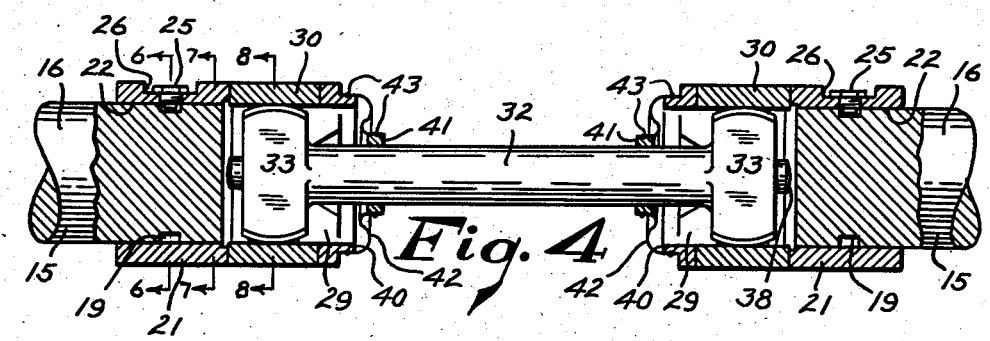
Fig. 4 is a section on the line 4—4 of Fig. 3.

If a roll stand is to be taken out of service or "dummied," the spindle coupling can easily be removed. It is merely necessary to remove the screws 25 and slide the coupling members 21 inwardly toward one another to the positions shown in Figs. 2 and 5. The rings 41 and the slippers 35 will slide along the spindle 32, and the spindle 32 will hold the slippers in place in the bores 28, as will be clear from Fig. 10. The spindle heads 33 will enter the spaces between the ribs 23, as shown in Fig. 9. The coupling members 21 will now be clear of the roll neck and pinion shaft, so that the spindle and coupling members may all be lifted directly upward without interference, as indicated in Fig. 2. The invention also facilitates the changing of rolls in a roll housing of the open-top type, since it is merely necessary to retract from the roll neck the corresponding coupling member, whereupon the roll can be raised without interference with any of the parts of the coupling.

The invention has relatively few parts, and these are comparatively simple and inexpensive to manufacture. For example, each coupling member 21 can be made of cast steel, with the socket 22 and chamber 29 formed in the casting. It is a very simple matter to machine the bore 28, with the counterbores at its ends for the plugs 30. In many cases it will be unnecessary to machine the walls of the socket 22, but this can readily be done if desired. It will also be noted that the rotatable elements 15 are of a comparatively simple shape which can be manufactured at relatively low cost.

Having thus described my invention, what I claim as new and desire to secure by Letters Patent is:

1. A universal coupling comprising a coupling member having a socket in its outer end shaped to engage a driving or driven element, a chamber in its inner end, and a transverse cylindrical bore intersecting and crossing the chamber, plugs closing the ends of the bore, two spaced slippers located within the bore, the slippers having convex cylindrical surfaces engaging the opposite walls of the bore and opposed parallel plane surfaces, a spindle entering the chamber, and a transverse head on the spindle between the slippers, the head having parallel plane surfaces on its opposite sides engaging the plane surfaces of the slippers, the ends of the head being shaped to provide spherical surfaces which engage the said plugs.

2. A universal coupling comprising a coupling member having a socket in its outer end shaped to engage a driving or driven element, a chamber extending from the socket to the inner end of the coupling member, and a transverse bore intersecting and crossing the chamber, the ends of the bore being closed, two spaced slippers engaging the opposite walls of the bore, a spindle entering the chamber, and a transverse head on the spindle between the slippers, the thickness of the head being at least as great as that of the adjacent portion of the spindle, and the socket being of a size and shape to receive the head as the coupling member and slippers are moved inwardly over the spindle.

3. A universal spindle comprising a coupling member having a socket in its outer end shaped to engage a driving or driven element, a chamber extending from the socket to the inner end of the coupling member, and a transverse bore intersecting and crossing the chamber, two spaced slippers engaging the opposite walls of the bore, a spindle entering the chamber, and a head on the spindle extending transversely thereof to form a T-shaped structure, the head being located between the slippers, the thickness of the head being at least as great as that of the adjacent portion of the spindle, and the socket being of a size and shape to receive the head as the coupling member and slippers are moved inwardly over the spindle.

4. A universal coupling comprising a coupling member having a socket in its outer end shaped to engage a driving or driven element, a chamber extending from the socket to the inner end of the coupling member, and a transverse bore intersecting and crossing the chamber, plugs closing the ends of the bore, two spaced slippers engaging the opposite walls of the bore, a spindle entering the chamber, and a transverse head on the spindle between the slippers with its ends engaging the plugs, the thickness of the head being at least as great as that of the adjacent portion of the spindle, and the socket being shaped to provide two diametrically opposed longitudinally extending grooves arranged to receive the ends of the head as the coupling member and slippers are moved inwardly over the spindle.

5. A universal coupling comprising a generally cylindrical coupling member having a socket in its outer end shaped to engage a driving or driven element, a chamber of oblong cross-section extending from the socket to the inner end of the coupling member, and a transverse cylindrical bore intersecting and crossing the chamber in the direction of its larger dimension, plugs closing the ends of the bore, two spaced slippers located within the bore, the slippers having convex cylindrical surfaces engaging the opposite walls of the bore and opposed parallel plane surfaces, a spindle entering the chamber, and a transverse head on the spindle having parallel plane surfaces on its opposite sides engaging the plane surfaces of the slippers and spherical surfaces on its ends engaging the plugs, the thickness of the head being at least as great as that of the adjacent portion of the spindle, and the socket being shaped to provide two diametrically opposed longitudinally extending grooves arranged to receive the ends of the head as the coupling member and slippers are moved inwardly over the spindle.

6. A universal coupling comprising a generally cylindrical coupling member having a socket in its outer end with a cylindrical inner surface interrupted by four longitudinally extending ribs equally spaced circumferentially to form two pairs of opposed grooves, a chamber of oblong cross-section extending from the socket to the inner end of the coupling member and aligned with one of the pairs of grooves, and a transverse cylindrical bore intersecting and crossing the chamber in the direction of its larger dimension, plugs closing the ends of the bore, two spaced slippers located within the bore, the slippers having convex cylindrical surfaces engaging the opposite walls of the bore and opposed parallel plane surfaces, a spindle entering the chamber, and a transverse head on the spindle having parallel plane surfaces on its opposite sides engaging the plane surfaces of the slippers and surfaces on its ends engaging the plugs, the thickness of the head being at least as great as that of the adjacent portion of the spindle, and the grooves in the socket being wider than the thickness of the head so that they will receive the ends of the head as the coupling member and slippers are moved inwardly over the spindle.

7. A universal coupling comprising a generally cylindrical coupling member having a socket in its outer end with a cylindrical inner surface interrupted by four longitudinally extending ribs equally spaced circumferentially to form two pairs of opposed grooves, a chamber of oblong cross-section extending from the socket to the inner end of the coupling member and aligned with one of the pairs of grooves, a transverse cylindrical bore intersecting and crossing the chamber in the direction of its larger dimension, and counterbores in the ends of the bore, plugs mounted in the counterbores and closing the bore at its ends, two spaced slippers located within the bore, the slippers having convex cylindrical surfaces engaging the opposite walls of the bore and opposed parallel plane surfaces, a spindle of substantially cylindrical cross-section entering the chamber, and a transverse head on the spindle having parallel plane surfaces on its opposite sides engaging the plane surfaces of the slippers and spherical surfaces on its ends engaging the plugs, the thickness of the head being at least as great as the diameter of the spindle, and the grooves in the socket being wider than the thickness of the head so that they will receive the ends of the head as the coupling member and slippers are moved inwardly over the spindle.

8. A universal coupling comprising a coupling member having a socket in its outer end shaped to engage a driving or driven element, a chamber extending from the socket to the inner end of the coupling member, and a transverse bore intersecting and crossing the chamber, the ends of the bore being closed, two spaced slippers engaging the opposite walls of the bore, a spindle entering the chamber, a transverse head on the spindle between the slippers, the thickness of the head being at least as great as that of the adjacent portion of the spindle, and the socket being of a size and shape to receive the head as the coupling member and slippers are moved inwardly over the spindle, a ring slidably mounted on the spindle, and a flexible annular boot connecting the ring with the inner end of the coupling member.

JOSEPH M. O'MALLEY.